(12) United States Patent
Chen et al.

(10) Patent No.: US 9,754,010 B2
(45) Date of Patent: Sep. 5, 2017

(54) GENERATION OF CUBE METADATA AND QUERY STATEMENT BASED ON AN ENHANCED STAR SCHEMA

(71) Applicant: International Business Machines Corporation, Armonk, NY (US)

(72) Inventors: Feng Chen, Beijing (CN); Miao He, Beijing (CN); Changrui Ren, Beijing (CN); Bing Shao, Beijing (CN); Qin Hua Wang, Beijing (CN); Wei Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 14/050,486

(22) Filed: Oct. 10, 2013

(65) Prior Publication Data
US 2014/0122415 A1    May 1, 2014

(30) Foreign Application Priority Data
Oct. 31, 2012    (CN) .......................... 2012 1 0428767

(51) Int. Cl.
*G06F 17/30*    (2006.01)
(52) U.S. Cl.
CPC .............................. *G06F 17/30592* (2013.01)
(58) Field of Classification Search
None
See application file for complete search history.

(56) References Cited

U.S. PATENT DOCUMENTS

| | | | |
|---|---|---|---|
| 6,578,028 B2 | 6/2003 | Egilsson et al. | |
| 7,546,312 B1* | 6/2009 | Xu | G06F 17/30563 |
| 7,953,694 B2 | 5/2011 | Colossi et al. | |
| 8,204,901 B2 | 6/2012 | Pimpale et al. | |
| 2004/0034616 A1 | 2/2004 | Witkowski et al. | |
| 2004/0122844 A1 | 6/2004 | Malloy et al. | |
| 2007/0094236 A1* | 4/2007 | Otter | G06F 17/30457 |
| 2008/0027966 A1 | 1/2008 | Parees et al. | |
| 2015/0134598 A1* | 5/2015 | Banerjee | G06F 17/30592 |
| | | | 707/607 |

OTHER PUBLICATIONS

Oxford English Dictionary [Captured Sep. 8, 2015], www.oed.com, http://www.oed.com/view/Entry/66993?redirectedFrom=external#eid.*

(Continued)

*Primary Examiner* — Jason Liao
(74) *Attorney, Agent, or Firm* — Cantor Colburn LLP; David Quinn

(57) ABSTRACT

A method for generating cube metadata based on an enhanced star schema may be provided. In some embodiments, the method may include extracting dimension references from a factless fact table in an enhanced star schema. The enhanced star schema may include a fact table, a plurality of dimension tables of the fact table and the factless fact table. In some embodiments, a hierarchy reference may be constructed based on the dimension references. In some embodiments, cube metadata may be generated by combining the hierarchy reference with measures obtained from the fact table and a hierarchy obtained from the dimension tables in the enhanced star schema.

18 Claims, 10 Drawing Sheets

(56) References Cited

OTHER PUBLICATIONS

"Cube metadata" "the external"—Google Search [Captured Sep. 8, 2015], www.google.com, https://www.google.com/?gws_rd=ssl#q=%22cube+metadata%22+%22the+external%22.*
Zidane, Database Systems and Structures 1998, Simon Fraser University, http://www.cs.sfu.ca/CourseCentral/354/zaiane/material/notes/contents.html, "/Chapter4/node15.html, "/Chapter4/node16.html#SECTION00461000000000000000, "Chapter4/node17.html#SECTION00462000000000000000.*
Kimball et al., The Data Warehouse Lifecycle Toolkit 1998, Wiley and Sons, pp. 212-216.*
WayBackMachine, [online]; [retrieved on Oct. 11, 2013]; retrieved from the Internet http://web.archive.org/web/20120220064545/http://www.datawarehousehelp.com/data-warehouse-concepts/factless-fact-table/ Data Warehouse Help, "Factless Fact Table," WayBackMachine Internet Archive, 2012, pp. 1-3.
IBM, [online]; [retrieved on Oct. 4, 2011]; retrieved from the Internet http://www.ibm.com/developerworks/data/library/techarticle/dm-0601dere/index.html Jason Dere, "Generate SQL Queries based on DB2 Cube Views Metadata," IBM, DeveloperWorks, Jan. 26, 2006, pp. 1-14.

* cited by examiner

US 9,754,010 B2

GENERATION OF CUBE METADATA AND QUERY STATEMENT BASED ON AN ENHANCED STAR SCHEMA

PRIORITY

This application claims priority to Chinese Patent Application No. 201210428767.5, filed Oct. 31, 2012, and all the benefits accruing therefrom under 35 U.S.C. §119, the contents of which in its entirety are herein incorporated by reference.

BACKGROUND

The present invention relates to data processing field, more specifically relates to a method and apparatus for generating cube metadata and generating query statements based on an enhanced star schema.

In the data processing field, online analytical processing (OLAP) is an approach to swiftly answer a multi-dimension analytical (MDA) query. OLAP is a broader classification of business intelligence, which also encompasses relational reporting and data mining. Databases configured for OLAP use a multidimensional data model, allowing for complex analytical and ad-hoc queries with a rapid execution time.

The core of any OLAP system is metadata schemas of OLAP cubes. With reference now to FIG. 13, a cube metadata schema of an OLAP cube is generally created according to star schema or snowflake schema of tables in the relational database, wherein measures are extracted according to records in fact tables and dimensions are extracted according to dimension tables.

FIG. 14 gives a specific example of the star schema. The star schema is a common multi-dimension data schema for presenting information and data in data warehouse. With reference now to FIG. 14, the star schema often consists of a fact table and some dimension tables around it.

Dimensions are literary descriptions of some point of view to business activities, and generally answers questions such as when, what product, where it is sold to and the like. Dimension data are stored in dimension tables. A dimension table may be divided into two parts: one part functions as ID of a primary key; the other is a set of characteristics fields of the dimension.

In addition, facts focus on data analysis in business activities and generally answers questions such as the unit price of a product, how many it is sold and the like. Fact data is stored in fact tables. A fact table may be divided into two parts: one part is foreign key fields pointing to primary keys of all dimension tables; the other part is measure fields.

With the ever-increasing complexity of the business, the star schema gradually faces a very tough challenge—factless fact table. A factless fact table is a fact table comprising no fact; that is, comprising no measure, and can be used for modeling many-to-many relationship among dimensions or capturing events.

Factless fact tables become more and more important, but its existence prevents independent data slice and dice from executing because a factless fact table is not taken into consideration in the star schema. At present, some methods, for example, Boolean Column, Multiple Columns, Bridge Table and the like can be adopted to convert factless fact tables when modeling for the purpose of being used in star schema indirectly. However, the conversion of a factless fact table using these methods causes some problems, such as more manual work needs to be introduced in conversion, dependence on knowledge of IT/business modeling staff, meanwhile additional resources are needed for storage and processing time of a query is increased at the database end.

SUMMARY

According to one aspect of the present invention, a method for generating cube metadata based on an enhanced star schema includes extracting dimension references from a factless fact table in an enhanced star schema comprising a fact table, a plurality of dimension tables of the fact table and the factless fact table; constructing a hierarchy reference based on the dimension references; and generating cube metadata by combining the hierarchy reference with measures obtained from the fact table and a hierarchy obtained from the dimension tables in the enhanced star schema.

According to another aspect of the present invention a method for generating query statements based on an enhanced star schema includes determining attributes of a factless fact object used in a query based on cube metadata generated by using the above method for generating cube metadata based on an enhanced star schema and a query demand obtained from external; searching for tables used by the factless fact object based on the cube metadata; and converting the attributes of the factless fact object into a query expression based on the tables used.

According to another aspect of the present invention an apparatus for generating cube metadata based on an enhanced star schema includes a dimension reference extraction unit configured to extract dimension references from a factless fact table in an enhanced star schema comprising a fact table, a plurality of dimension tables of the fact table and the factless fact table; a hierarchy reference construction unit configured to construct a hierarchy reference based on the dimension references; and a generation unit configured to generate cube metadata by combining the hierarchy reference with measures obtained from the fact table and a hierarchy obtained from the dimension tables in the enhanced star schema.

According to another aspect of the present invention, an apparatus for generating query statements based on an enhanced star schema includes: a factless fact object attribute determination unit configured to determine attributes of a factless fact object used in a query based on cube metadata generated by using the above apparatus for generating cube metadata based on an enhanced star schema and a query demand obtained from the external; a factless fact table search unit configured to search for tables used by the factless fact object based on the cube metadata; and a factless fact object conversion unit configured to convert the attributes of the factless fact object into a query expression based on the tables used.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
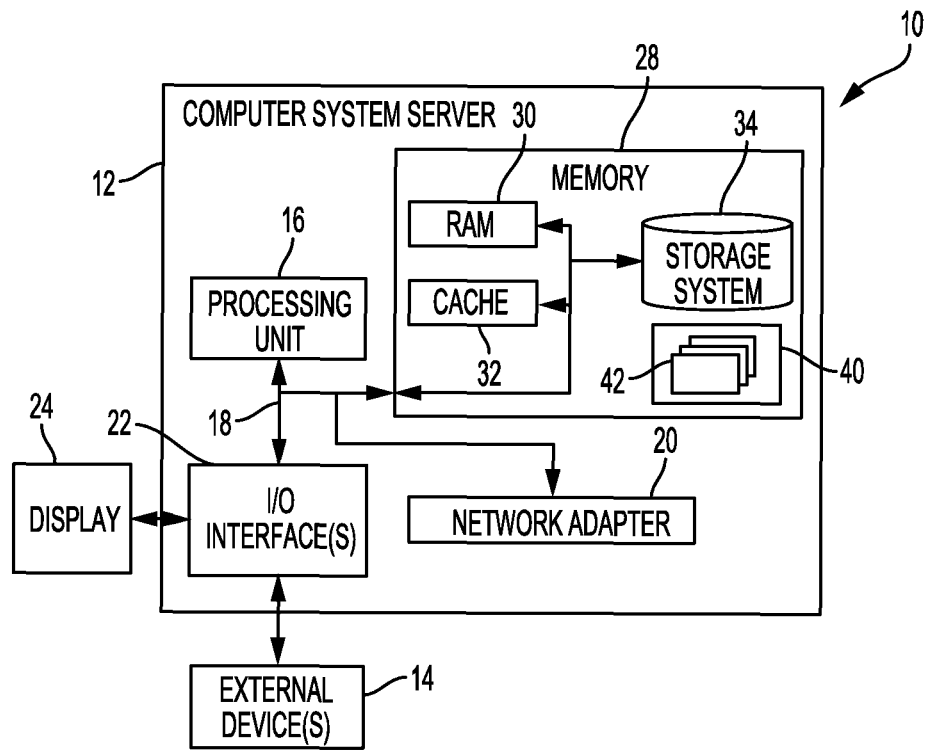
FIG. 1 shows a block diagram of an exemplary computer system/server which is applicable to implement the embodiment of the present invention.

Embodiments of the present invention provide a method and apparatus for generating cube metadata and generating query statements based on an enhanced star schema in which factless fact tables are directly used together with fact tables and dimension tables without being converted when generating cube metadata so as to cope with the ever-increasing usage demand of factless fact tables in online analytical processing.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
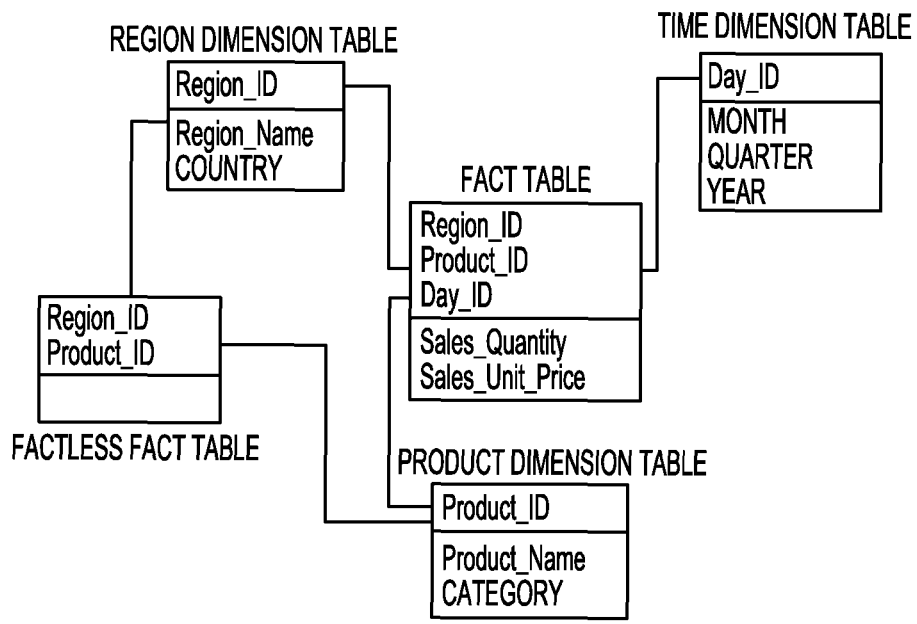
FIG. 2 shows a specific example of an enhanced star schema in the embodiment of the present invention.

FIG. 2 shows an example of an enhanced star schema in the embodiment of the present invention. With reference now to FIG. 2, an enhanced star schema of the present invention comprises a fact table and a plurality of dimension tables of the fact table, in addition, also comprises a factless fact table. The following Tables 1-3 respectively show examples of the region dimension table, product dimension table and time dimension table in FIG. 2.

TABLE 1

Region Dimension table

| Region_ID | Region_Name | Country | ... |
|---|---|---|---|
| R100 | Beijing | China | ... |
| R200 | Shandong | China | ... |
| ... | ... | ... | ... |

TABLE 2

Product Dimension table

| Product_ID | Product_Name | Category | ... |
|---|---|---|---|
| P100 | 32 inch 720p HDTV | TV | ... |
| P200 | 15.6 inch notebook | PC | ... |
| ... | ... | ... | ... |

TABLE 3

Time Dimension table

| Day_ID | Month | Quarter | Year |
|---|---|---|---|
| 2012.03.10 | 2012.03 | 2012.Q1 | 2012 |
| 2012.05.23 | 2012.05 | 2012.Q2 | 2012 |
| ... | ... | ... | ... |

As can be seen, a dimension table can be divided into two parts: one part functions as ID of primary keys, the other part is a set of characteristic fields of the dimension corresponding to the dimension table. For example, the region dimension table shown in Table 1 contains a unique Region ID, and a Region_Name as well as Country as characteristic fields of region dimension. The product dimension table shown in Table 2 contains a unique Product_ID, and a Product_Name as well as Category as characteristic fields of product dimension. The time dimension table shown in Table 3 contains a unique Day_ID, and a Month, Quarter as well as Year as characteristic fields of time dimension.

Furthermore, Table 4 shows an example of a fact table corresponding to dimension tables shown in Tables 1-3 in FIG. 2:

TABLE 4

Fact Table

| Day_ID | Product_ID | Region_ID | Sales_Quantity | Sales_Unit_Price |
|---|---|---|---|---|
| 2012.03.10 | P100 | R100 | 2000 | 100 |
| 2012.03.10 | P100 | R200 | 2100 | 60 |
| 2012.03.10 | P200 | R100 | 4000 | 150 |
| 2012.05.23 | P100 | R100 | 2000 | 70 |
| 2012.05.23 | P100 | R200 | 2050 | 200 |
| ... | ... | ... | ... | ... |

As can be seen, the fact table also can be divided into two parts: one part is at least one foreign key field pointing to the primary key of one of the plurality of dimension tables; the other part is a set of measure fields. For example, the fact table shown in Table 4 comprises foreign key fields pointing to of the primary keys of all Dimension tables 1-3, namely, Day_ID, Product_ID and Region_ID, also comprises a set of measure fields, namely, Sales_Quantity and Sales_Unit_Price.

Furthermore, a factless fact table does not contain any fact, that is, does not contain any measure field, showing the corresponding relationship between dimensions and it can be used for modeling many-to-many relationship among the dimensions or capturing events. The following Table 5 shows an example of the factless fact table in FIG. 2.

TABLE 5

Factless Fact Table

| Product_ID | Region_ID |
|---|---|
| P100 | R100 |
| P100 | R200 |
| P200 | R100 |
| ... | ... |

As can be seen, a factless fact table can comprise a plurality of foreign key fields respectively pointing to the primary key of one of the plurality of dimension tables, showing the corresponding relationship between these primary keys. For example, the factless fact table shown in Table 5 is a Product and Sales Region correspondence table, comprising two fields, namely, Product ID and Region ID to show which products are sold to which regions.

To sum up, a dimension table does not contain any information of foreign key; a fact table comprises one or more foreign keys and contains measure (amount) fields; a factless fact tables merely contains one or more foreign keys and does not contain other field except possible primary keys. However, since a fact table also can be treated as a dimension table in actual practice, the type of a table is generally distinguished by taking the type of the table as an input of the system or in a way that the system adopts a combination of characteristic identification plus manual setting when modeling.

The concept of an enhanced star schema of the present invention is described by the detailed examples hereinabove. According to the present invention, a factless fact table is directly used together with a fact table and dimension tables without being converted in the data schema, i.e. the star schema of the prior art is expanded so as to directly comprises a factless fact table to thereby constitute an enhanced star schema.

Figure 3:
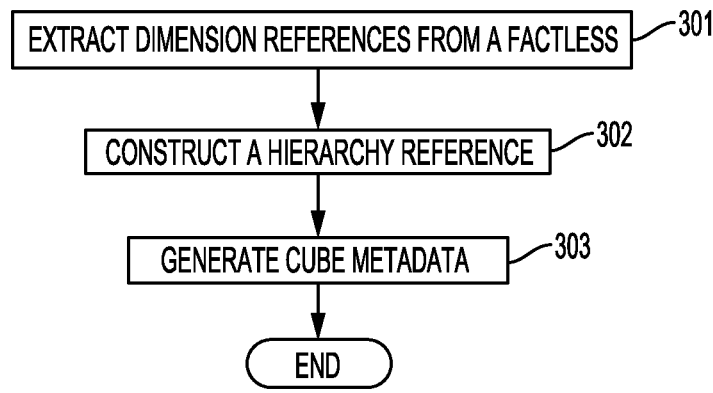
FIG. 3 shows outline flow chart of a method for generating cube metadata based on an enhanced star schema in the embodiment of the present invention.

A method for generating cube metadata based on an enhanced star schema of the present invention will be described as follows. FIG. 3 shows an outline flow chart of the method.

With reference now to FIG. 3, in the method, at block 301, dimension references are extracted from the factless fact table in the enhanced star schema comprising a fact table, a plurality of dimension tables of the fact table and a factless fact table referring to FIG. 2.

At block 302, hierarchy references are constructed according to the dimension references.

At block 303, cube metadata are generated by combining the hierarchy references with measures obtained from the fact table and hierarchy obtained from the dimension tables in the enhanced star schema.

Figure 4:
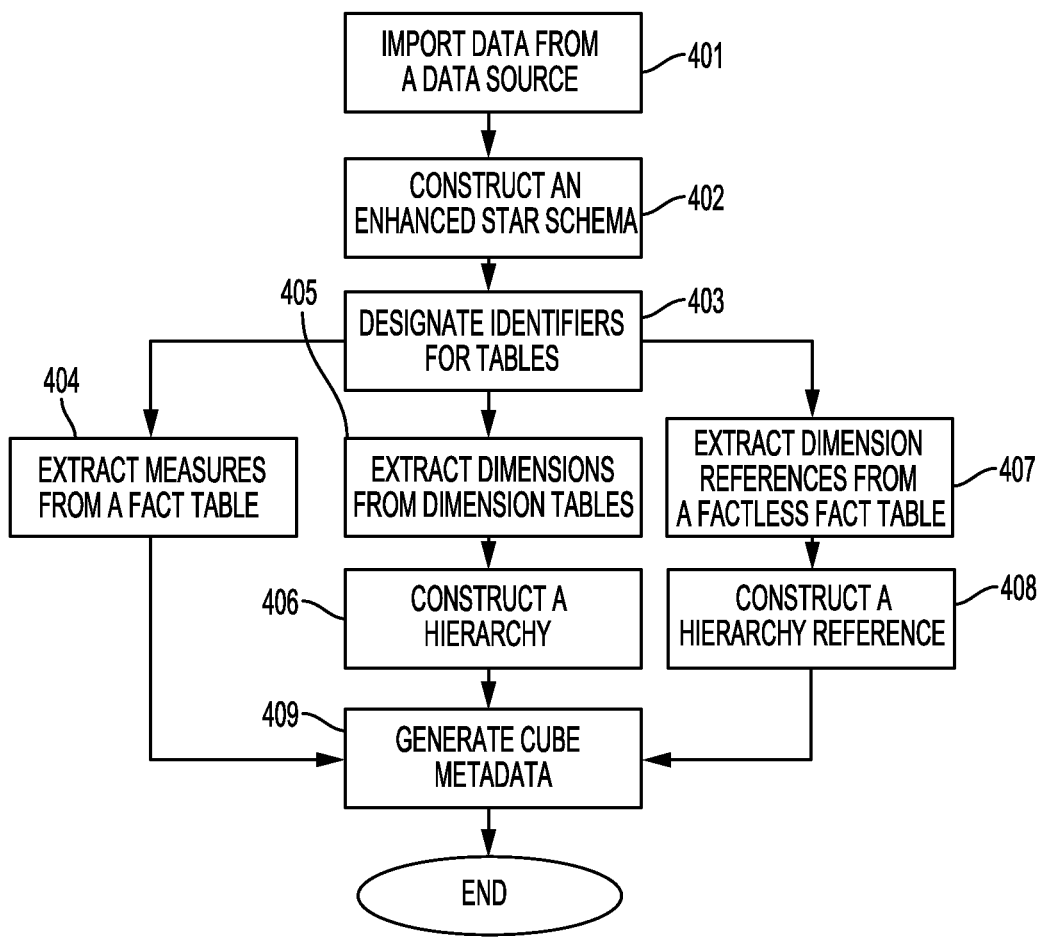
FIG. 4 shows detailed flow chart of a method for generating cube metadata based on an enhanced star schema in the embodiment of the present invention.

The method blocks shown in FIG. 3 represent a part added or improved by the method for generating cube metadata of the present invention regarding on the enhanced star schema proposed by the present application. Combined with the part already performed by the method for generating cube metadata based on the star schema in the prior art, the specific process of the method for generating cube metadata based on the enhanced star schema of the present invention will be described as follows. FIG. 4 shows the detailed flow chart of the method.

The part as blocks 401-406 in FIG. 4 is that already performed by the method for generating cube metadata based on the star schema in the prior art, the part at blocks 407-409 is that corresponding to FIG. 3.

More specifically, with reference now to FIG. 4, firstly data is imported from a data source in the method at block 401. The data comprises tables and their types as well as relational data in a relational database.

At block 402, the enhanced star schema is constructed based on the tables and types of tables, that is, tables are associated based on types of tables according to the enhanced star schema. Here, as mentioned above, the tables comprise a fact table, a plurality of dimension tables of the fact table and a factless fact table, these tables being distinguished based on types of tables input together with them. As to this block, it can make reference to the description of the enhanced star schema above in combination to FIG. 2.

At block 403, an identifier is designated respectively for the fact table, dimension tables and the factless fact table in the enhanced star schema.

At block 404, measures are extracted from the fact table in the above tables.

At block 405, dimensions are extracted from the plurality of dimension tables in the above tables.

At block 406, a hierarchy is constructed according to the dimensions extracted at block 405.

Figure 5A:
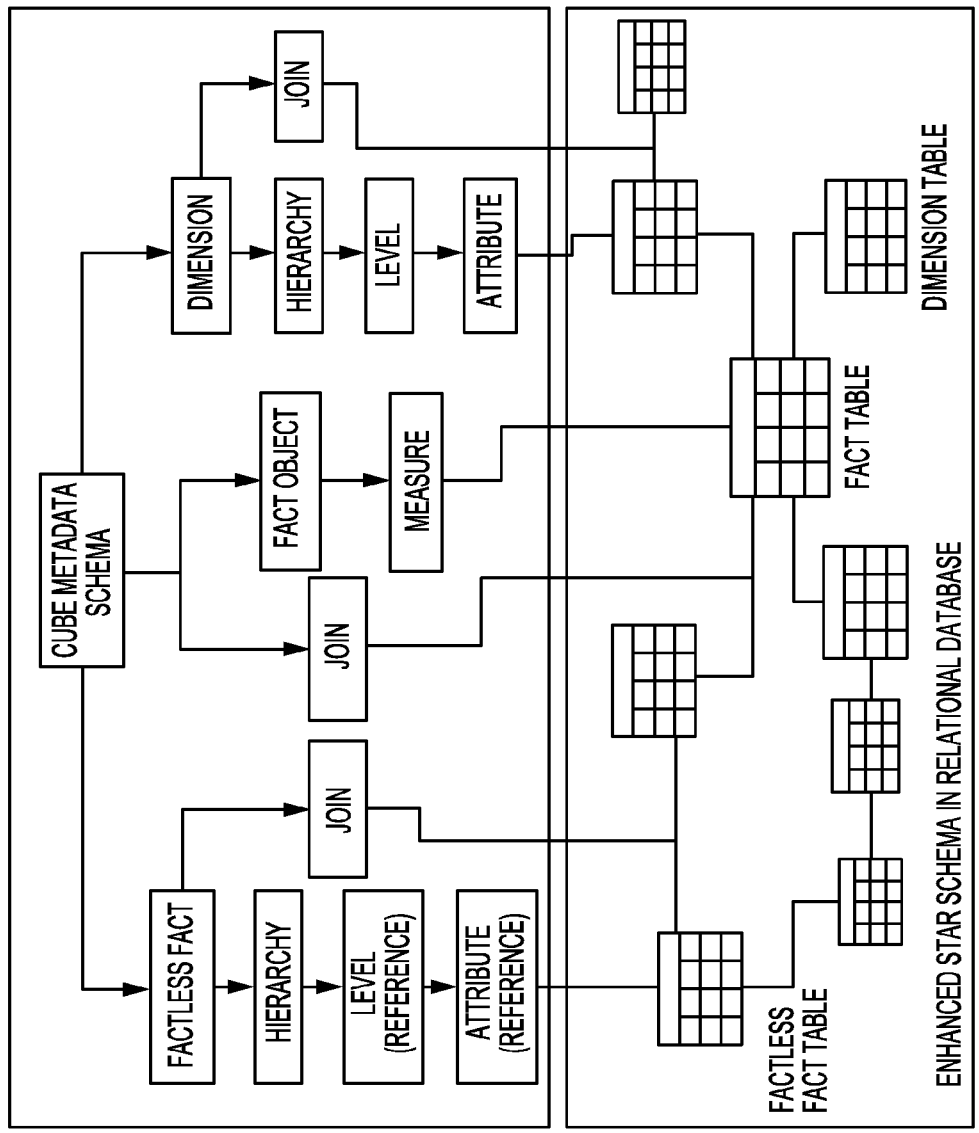
FIGS. 5(a), 5(b) and 5(c) are a schematic diagram corresponding to the flow chart of FIG. 4.
Figure 5B:
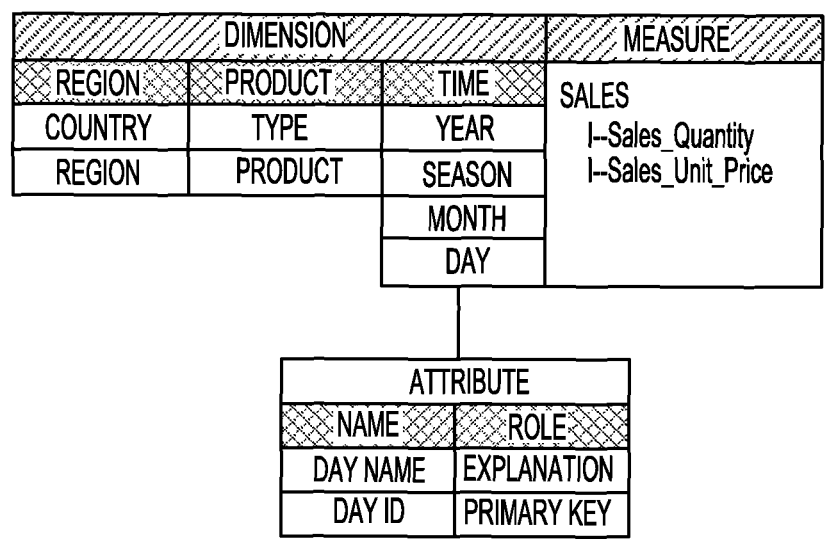

FIG. 5 is a schematic diagram of a process of generating cube metadata corresponding to the flow chart of FIG. 4, wherein FIG. 5(a) is a schematic diagram of a whole process of generating the cube metadata, FIG. 5(b) provides an example of a result generated through blocks 404-406 in star schema in which a factless fact fable is directly used together with fact tables and dimension tables without being converted, it can not only cope with the ever-increasing usage demand of a factless fact fable in data analytical processing, but also save manual work, storage space, dependence on the knowledge of IT/business modeling staff and the like required in the conversion of a factless fact fable in the prior art.

A method for generating query statements based on an enhanced star schema of the present invention is described as follows.

Firstly, as a contrast, a whole flow of generating query statements in the prior art will be explained by specific examples. For example, following the example in the above FIG. 2 and Tables 1-5, Table 6 below shows an example of a query of Sales_Quantity and SALES_Amount aggregated based on Month, Region and Product.

TABLE 6

| Month | Region | Product | Sales_Quantity | SALES_Amount |
|---|---|---|---|---|
| <Month> | <Region> | <Product> | <Sales_Quantity> | <Sales_Quantity> * <SALES_UNIT_PRICE> |
| <Month> | <Region> | <Product> | <Sales_Quantity> | <Sales_Quantity> * <SALES_UNIT_PRICE> |
| <Month> | <Region> | <Product> | <Sales_Quantity> | <Sales_Quantity> * <SALES_UNIT_PRICE> |

Figures 5C, 6, 7:
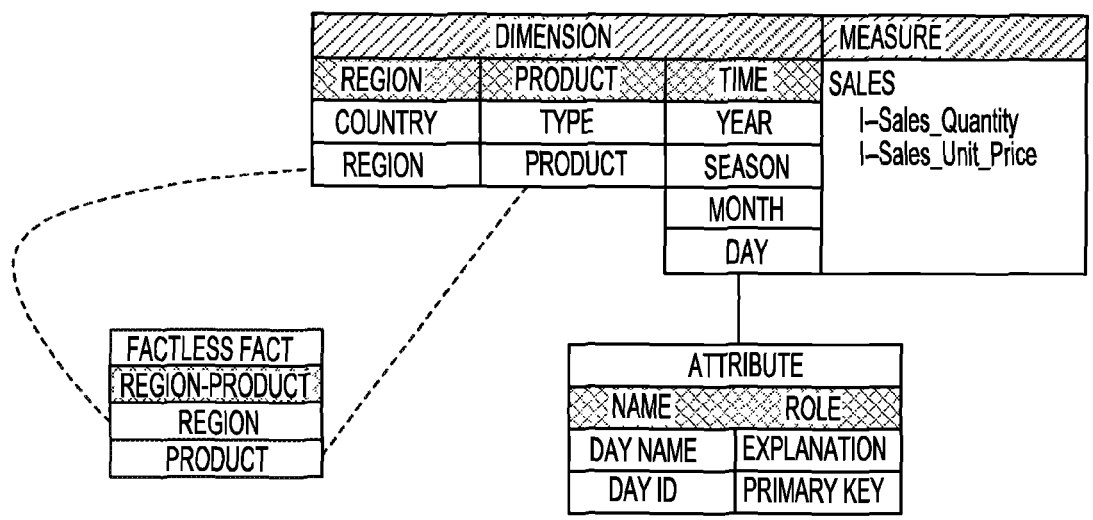
FIG. 6 shows an example of a hierarchy constructed according to a factless fact table.
FIG. 7 is a schematic diagram of selection interface reminding users to select a comparison item.

FIG. 4 and FIG. 5(c) provides an example of cube metadata obtained after completing all of the blocks in FIG. 4. With reference now to FIG. 5(b), the result generated through blocks 404-406 is further divided into 3 parts. The first part is dimension part corresponding to the dimensions, hierarchy and level in cube metadata. The second part is attributes for describing the attribute of the level and in the example of FIG. 5(b), the attribute of Day is described. The third part is measures part of the fact, describing two measures Sales_Quantity and Sales_Unit_Prices under the fact "sales".

At block 407, dimension references are extracted from the factless fact table in the above tables. For example, in the case of the factless fact table shown in the above Table 5, since the product dimension and region dimension are referred to, a product dimension reference and a region dimension reference are extracted.

At block 408, a hierarchy reference is constructed according to the dimension references extracted at block 407. For example, in the case of factless fact tables shown in the above FIG. 5, a hierarchy shown in FIG. 6 is constructed according to the extracted product dimension reference and region dimension reference.

At block 409, cube metadata is generated by combining the hierarchy reference constructed at block 408 with measures extracted at block 404 and the hierarchy constructed at block 406.

The finally-obtained cube metadata schema shown in FIG. 5(c) is a result combining the part shown in FIG. 5(b) with the part generated through blocks 407-408. The "factless fact" part in FIG. 5(c) is a result generated through blocks 407-408 in FIG. 4, wherein, two levels "Region" and "Product" in Region-Product are references to two levels "Region"-"Region" and "Level"-"Level". The reference relationship is decided according to the relationship between major and foreign key in the table relationship.

The method for generating cube metadata based on an enhanced star schema of the present invention is described as above. According to embodiments of the present invention, since cube metadata is generated based on an enhanced In the case of query shown in FIG. 6 above, if some implementation in the prior art is applied, an example of the generated SQL query statement based on the star schema is shown in the following list.

```
SELECT
[1]
  T1." MONTH " AS "MONTH (TIME)",
  T1."YEAR" AS "YEAR (TIME)",
  T2."REGION_ID" AS "REGION_ID (REGION)",
  T2."REGION_NAME" AS "REGION_NAME (REGION)",
  T2."COUNTRY" AS "COUNTRY (REGION)",
  T3."PRODUCT_ID" AS "PRODUCT_ID (PRODUCT)",
  T3."PRODUCT_NAME" AS "PRODUCT_NAME (PRODUCT)",
  T3."CATEGORY" AS " CATEGORY (PRODUCT)",
[2]
  SUM(T4." SALES_QUANTITY ") AS "SALES_QUANTITY (SALESFACT)",
  SUM(T4." SALES_QUANTITY " * T4." SALES_UNIT_PRICE ")
AS "SALES_AMOUNT"
FROM
[3]
  "SAMPLE"."TIME" AS T1,
  "SAMPLE"."REGION" AS T2,
  "SAMPLE"."PRODUCT" AS T3,
  "SAMPLE"."SALESFACT" AS T4
WHERE
[4]
  (T1."DAY_ID" = T4."DAY_ID"
  AND T2."REGION_ID" = T4."REGION_ID"
  AND T3."PRODUCT_ID" = T4."PRODUCT_ID")
[5]
  AND (T1."YEAR" = 2012)
  AND T1."MONTH" = '2012.01'
  AND T2."REGION_NAME" = 'NORTH'
  AND T2."COUNTRY" = 'CHINA'
GROUP BY
[1]
  T1."MONTH",
  T1."YEAR",
  T2."REGION_ID",
  T2."COUNTRY",
  T3."PRODUCT_ID",
  T3."CATEGORY"
```

The meanings of the components of above SQL sentence are as follows.

The attributes in the SELECT clause of segment [1] comes from a slice of the query accessed cube metadata schema, these attributes appearing in the SELECT clause and GROUP BY clause.

The SELECT clause of segment [2] are measures used in the query, they appearing in the SELECT clause.

The FROM clause of segment [3] is decided by a junction object of cube metadata schema, comprising dimension tables and fact tables.

A junction object from dimensions, facts and Cube schema of the WHERE clause of segment [4] forms junction predicates of the WHERE clause.

The WHERE clause of segment [5] also comprises any predicate for generating result subsets.

In addition, there exists many methods for generating query statements based on the star schema in the prior art. The exemplary query as shown in the above FIG. 6 may be implemented by applying any method for generating a query in the prior art.

In addition, it can be seen that the above query statement merely applies dimension tables and fact tables and is generated by the star schema in the prior art. In the case of star schema, independent queries such as the sales data of all products in all regions in some year, the sales data of all products in some region in all years, the sales data of some product in some region in some year may be performed in OLAP processing, but many-to-many relationship processing such as comparison of sales status between two regions cannot be performed.

By contrast, in the abovementioned enhanced star schema of the present invention, a factless fact table is processed as a part of the schema. In the case of enhanced star schema comprising a factless fact table, the modeling of many-to-many relationship can be performed.

For example, following examples of the above FIG. 2 and Tables 1-5, when it needs to compare the sales status of products in Beijing region with the sales status of products in Shandong region, a selection interface as shown in FIG. 7 can be formed to remind users to select comparison items based on the hierarchy constructed according to the factless fact table shown in FIG. 5 when specific implement. When the user selects to compare product P200 in Beijing region with product P100 in Shandong region as shown in FIG. 7, the following predicates shall be added in the SQL Where clause of SQL query statement:

(REGION_ID='R100' AND PRODUCT_ID='P200')
OR (REGION_ID='R200' AND PRODUCT_ID='P100').

Figure 8:
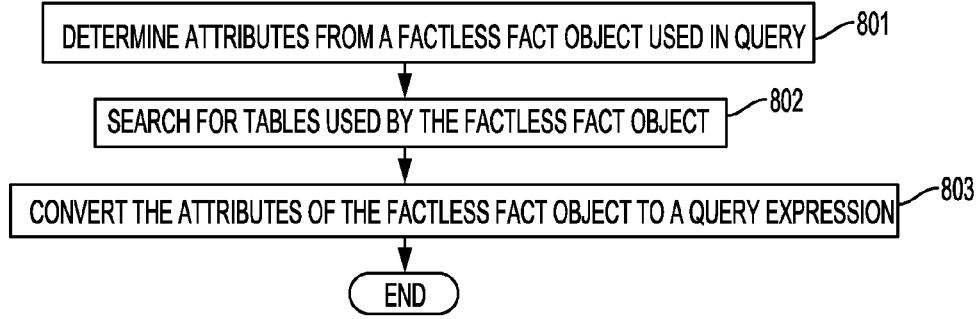
FIG. 8 shows an outline flow chart of a method for generating query statements based on an enhanced star schema in the embodiment of the present invention.

The above query statement can be obtained using the method for generating query statements based on an enhanced star schema of the present invention. FIG. 8 shows an outline flow chart of the method for generating query statements based on enhanced star schema of the present invention.

With reference now to FIG. 8, in the method at block 801, the attributes of factless fact object used in the query is determined based on cube metadata generated by the method for generating cube metadata based on an enhanced star schema and a query demand obtained from the external.

At block 802, tables used by the factless fact object are searched based on the cube metadata.

At block 803, the attributes of the factless fact object are converted to query expression based on the tables used.

Figure 9:
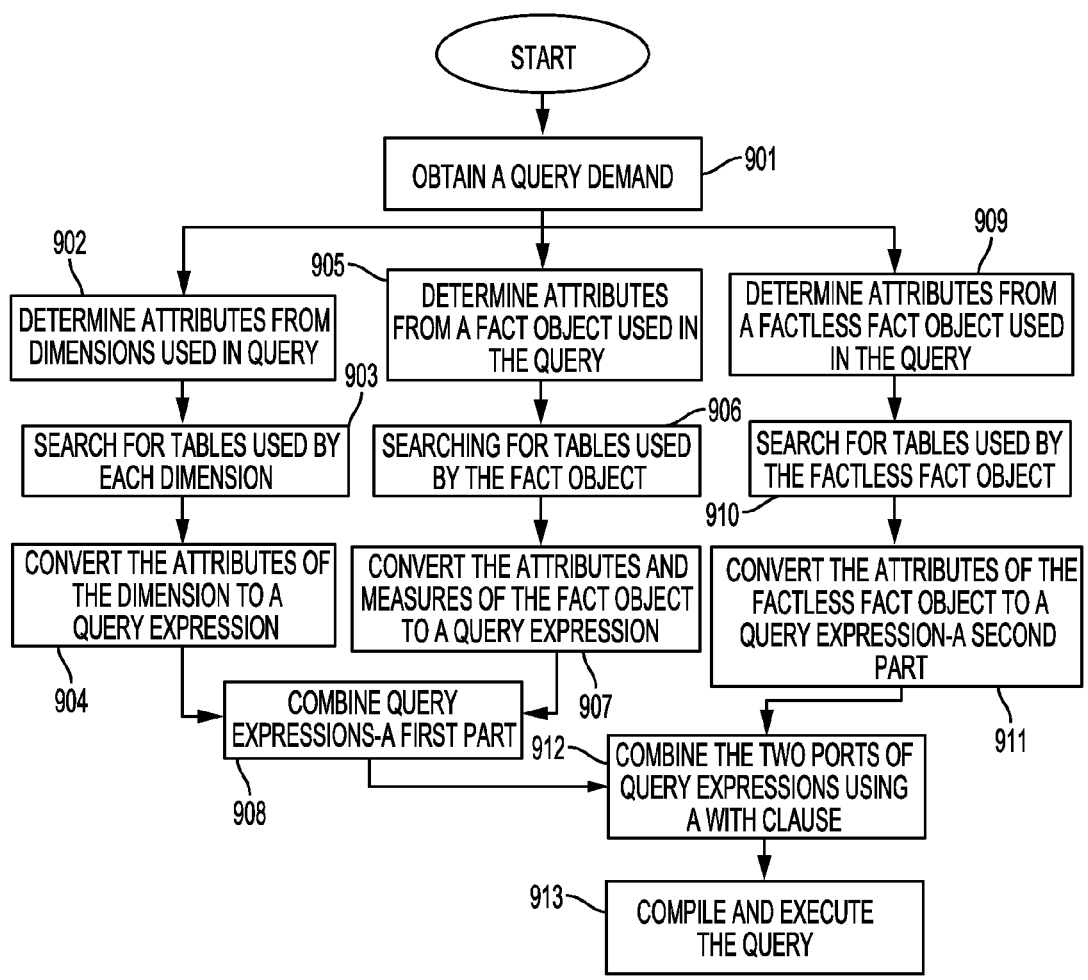
FIG. 9 shows a detailed flow chart of a method for generating query statements based on an enhanced star schema in the embodiment of the present invention.

It shall be explained that the method blocks shown in FIG. 8 is a part added or improved by the method for generating query statements of the present invention regarding on the enhanced star schema proposed by the present application. Combined with the part already performed by the method for generating query statements based on the star schema in the prior art, the specific process of the method for generating query statements based on the enhanced star schema of the present invention will be described as follows. FIG. 9 shows the detailed flow chart of the method.

The part as blocks 901-908 and 913 in FIG. 9 is that already performed by the method for generating query statements based on the star schema in the prior art and the part at blocks 909-911 is that corresponding to FIG. 8.

Specifically, in FIG. 9, first at block 901, a query demand is obtained. The query demand can be obtained from the user through a user interface.

The following blocks 902-904 are parts in which the dimension data is processed. At block 902, it is determined which attributes from dimension data are used in the query based on cube metadata generated by the method of FIG. 4 on a basis of an enhanced star schema and the query demand obtained from the external. At block 903, the table that is used by each dimension determined at block 902 is searched based on the cube metadata. At block 904, the attributes of the dimension is converted to a query expression based the table used by it.

The following blocks 905-907 are parts in which the fact object is processed. At block 905, it is determined which attributes from fact object are used in the query based on the cube metadata and the query demand. At block 906, the tables used by the fact object are searched based on the cube metadata. At block 907, the attributes and measures of the fact object are converted to a query expression based the tables used.

At block 908, the first part of query expression is formed by combining the query expression converted from the dimensions at the above block 904 with the query expression converted from the fact object at block 907.

Next, blocks 909-911 are parts in which the factless fact object is processed. At block 909, it is determined which attributes from factless fact object are used in the query based on the cube metadata and the query demand.

More specifically, regarding each collection of dimensions, hierarchy, levels from the factless fact object in the query, it is determined which dimension attributes, the attributes of the level keys of the levels and value thereof are used. Here, the current dimension, hierarchy and level being currently analyzed are called Dimension Di, Hierarchy Hi and Level Li. The attribute of level key of Level Li shall exist in the query statement. Query statements will select and group according to the level key of Level Li so as to ensure the correct detail level of Dimension Di is adopted. The value selected by Level Li is added to the query condition predicates so as to provide the query a possible filter. Level key from any parent level of Level Li also needs to be added to the query statement. The value corresponding to the parent level also needs to be added to conditional predicates.

For example, in the query of comparing product P200 in Beijing region with product P100 in Shandong region as shown in FIG. 7, the user makes two selections which are "Beijing—P200" and "Shandong—P100" respectively. Theses selection are from a tree structure constructed based on the factless fact object "Region-Product" and the hierarchy comprises two levels: region and product, wherein the product is the current level (the lowest selective level) Li. It needs to add the attribute of level key of product level Product_ID to the query statement and add value 'P100' and 'P100' (the level key value corresponding to P200) to conditional predicates. Meanwhile, level keys of parent level and the corresponding values (R100 and R200 are values of level keys corresponding to regions "Beijing" and "Shandong" respectively) shall be also added to the query statement. I.e.:

Attributes of level keys:
Product_ID, Region_ID
Values:
REGION_ID='R100' AND PRODUCT_ID='P200';
REGION_ID='R200' AND PRODUCT ID='P100'.

At block 910, the tables used by the factless fact object are searched based on the cube metadata.

Specifically, the table column/attribute reference list in each attribute determined at block 909 is checked, the table column/attribute reference list of each attribute comprising references by the attribute to other table column/attribute. Next, the reference table of each attribute is determined according to the table column/attribute reference list. If the table column/attribute reference list contains a reference pointing to a table column, this table is added to the table collection used by this attribute; if the table column/attribute reference list comprises a reference pointing to another attribute, the table column/attribute reference list of that attribute is checked so as to finally search any other tables used by each attribute; if the table column/attribute reference list contains a reference pointing to a table column and also contains a reference pointing to another attribute, this table is added to the table collection used by this attribute and also the table column/attribute reference list of that attribute is check so as to finally search any other tables used by each attribute. Finally, the junction relationship between the factless fact table and reference tale is determined.

In the example of FIG. 7, the factless dimension "Region-Product" corresponds to the factless fact table Region-Product, this table points to the reference tables Product and Region through attributes of level keys Product_ID and Region_ID. Thus it is determined as follows:

Factless fact table:
Region-Product
Reference tables:
Product
Region
junction relationship:
Region-Product.Product_ID=Product.Product_ID
Region-Product.Region_ID=Region.Region_ID.

At block 911, the attributes of the factless fact object are converted to a query expression based on the tables used.

Specifically, the attributes and value relationship of each dimension identified at the above blocks 909 and 910 are converted to a query expression so as to form the second part of query expression. Firstly, a unique association name is allocated for each identified factless fact table. For example, an association name T5 is allocated for the factless fact table Region-Product mentioned in the above example. Then, for each factless fact object, an expression is formed in the following way.

Select clause:
Taking the attribute of the level key of factless dimension as a column;
From clause:
Adding the factless fact tables and association name thereof;
Where clause:
The value corresponding to factless dimension forms user predicates, the predicates being combined in a way of OR.

For example, in the case of the query as shown in the above FIG. 7, the following example of SQL query statement can be formed:

Select
T5. Product_ID, T5.Region_ID
From
"SAMPLE"."Region_Product" AS T5
Where
(T5.REGION_ID='R100' AND T5.PRODUCT_ID='P200')
OR (T5.REGION_ID='R200' AND T5.PRODUCT_ID='P100')

At block 912, the final query statement is generated by combining the first part of query expression generated at block 908 with the second part of query expression generated at block 911.

Specifically, at this block, the second part of query expression generated at block 911 can be taken as a table declaration and is allocated a unique association name. For example, an association name T6 is designated for the exemplary query expression at block 911. Next, at this block, the second part of query expression generated at block 911 is joined in a junction object table of the first part of query expression generated at block 908 as a table declaration according to the junction relationship between the factless fact table and reference table determined at block 910. If the reference table does not exist in the first part of query expression, it needs to judge the junction relationship between the reference table and an already-existed table and add it to the junction object of the query expression.

For example, as to the query of comparing the sales status of product P200 in Beijing region with the sales status of product P100 in Shandong region as shown in FIG. 7, the example of SQL query statements generated by the method for generating query statements based on an enhanced star schema of the present invention is as follows.

Select
T5. REGION_ID, T5.PRODUCT_ID
From
"SAMPLE"."Region_Product" AS T5
Where
(T5.REGION_ID = 'R100' AND T5.PRODUCT_ID = 'P200')
OR (T5.REGION_ID = 'R200' AND T5.PRODUCT_ID = 'P100').
) AS T6,
SELECT
 T1."MONTH" AS "MONTH (TIME)",
 T1."YEAR" AS "YEAR (TIME)",
  T2."REGION_ID" AS "REGION_ID (REGION)",
  T2."REGION_NAME" AS "REGION_NAME (REGION)",
  T2."COUNTRY" AS "COUNTRY (REGION)",
  T3."PRODUCT_ID" AS "PRODUCT_ID (PRODUCT)",
  T3."PRODUCT_NAME" AS "PRODUCT_NAME (PRODUCT)",
   T3."CATEGORY" AS " CATEGORY (PRODUCT)",
  SUM(T4." SALES_QUANTITY ") AS "SALES_QUANTITY (SALESFACT)",
   SUM(T4." SALES_QUANTITY " * T4." SALES_UNIT_PRICE ")
AS "SALES_AMOUNT"
 FROM
  "SAMPLE"."TIME" AS T1,
  "SAMPLE"."REGION" AS T2,
  "SAMPLE"."PRODUCT" AS T3,
  "SAMPLE"."SALESFACT" AS T4,
  T6
 WHERE
  (T1."DAY_ID" = T4."DAY_ID"
  AND T2."REGION_ID" = T4."REGION_ID"
  AND T3."PRODUCT_ID" = T4."PRODUCT_ID",
  AND T2. "REGION_ID" = T6."REGION_ID"
  AND T3."PRODUCT_ID" = T6."PRODUCT_ID"),

```
AND (T1."YEAR" = 2012)
AND T1."MONTH" = '2012.01'
AND T2."REGION_NAME" = 'NORTH'
AND T2."COUNTRY" = 'CHINA'
GROUP BY
  T1."MONTH",
  T1."YEAR",
  T2."REGION_ID",
  T2."COUNTRY",
  T3."PRODUCT_ID",
  T3."CATEGORY"
```

Herein, the underlined sections in the above SQL query statements are those generated by the above method of the present invention through blocks 909-911 regarding the factless fact object.

Next, at block 913, the generated query statements are compiled and the query execution result is output.

The method for generating query statements based on an enhanced star schema of the present invention is described as above by the specific example. Although an example of SQL query statement regarding relational database is cited as a specific example of query statements in the above description, those skilled in the art can understand since the concept of enhanced star schema proposed in the present invention is used to describe a multidimensional data relationship, if only it is such a multidimensional data relationship, the concept of enhanced star schema of the present invention can be applied and further the generation of query statements is performed on the basis of the concept. For example, the method shown in the above FIGS. 8 and 9 can also be applied in queries of dimension database and object database, etc.

According to embodiments of the present invention, since query statements are generated based on cube metadata on the basis of enhanced star schema when querying and a factless fact tables is used together with fact tables and dimension tables without being converted, it can not only cope with the ever-increasing usage demand of a factless fact fable in data analytical processing, but also save manual work, storage space, dependence on the knowledge of IT/business modeling staff and the like required in the conversion of a factless fact fable in the prior art.

Figure 10:
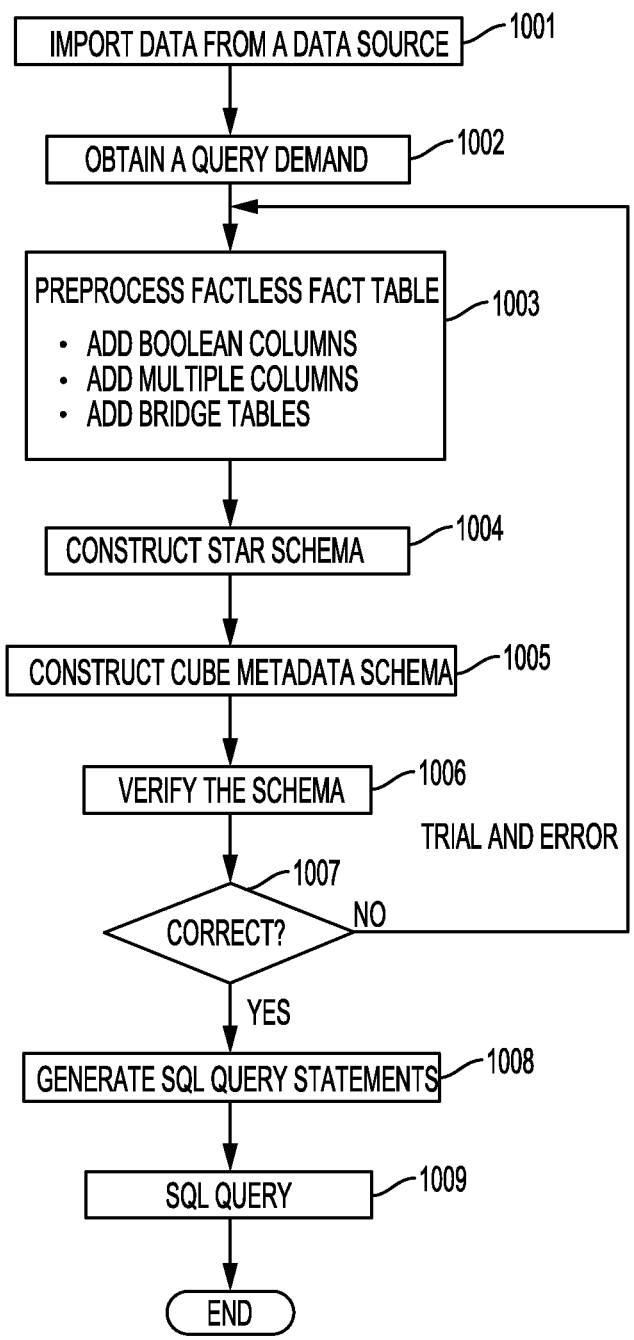
FIG. 10 shows a flow chart of online analytical processing method based on the star schema in the prior art.

By contrast, FIG. 10 shows a flow chart of online analytical processing based on the star schema in the prior art. With reference now to FIG. 10, in the prior art, a factless fact table is preprocessed by adopting a Boolean column, multicolumn or bridge table at block 1003 before the construction of star schema so as to reconstruct the original tables and the relationship between the tables in the database, and furthermore cube metadata needs to be verified in terms of dimension integrity, mapping relationship and the like at block 1006 after cube metadata is constructed. If there is an error, it is turned to block 1003 to reprocess the factless fact table.

As can be seen by contrast, compared with the method in the prior art, the method for generating cube metadata and generating query statements based on an enhanced star schema of the present invention does not reconstruct a factless fact table in the database and directly use the fields and corresponding relationships thereof and further does not need trial and error but directly constructs an enhanced star schema and its corresponding cube metadata, more works are completed by a query compiler so that the process of data modeling is simplified, the data modeling ability of the data warehouse is expanded and meanwhile the cost and time for generating cube metadata are saved.

Figure 11:
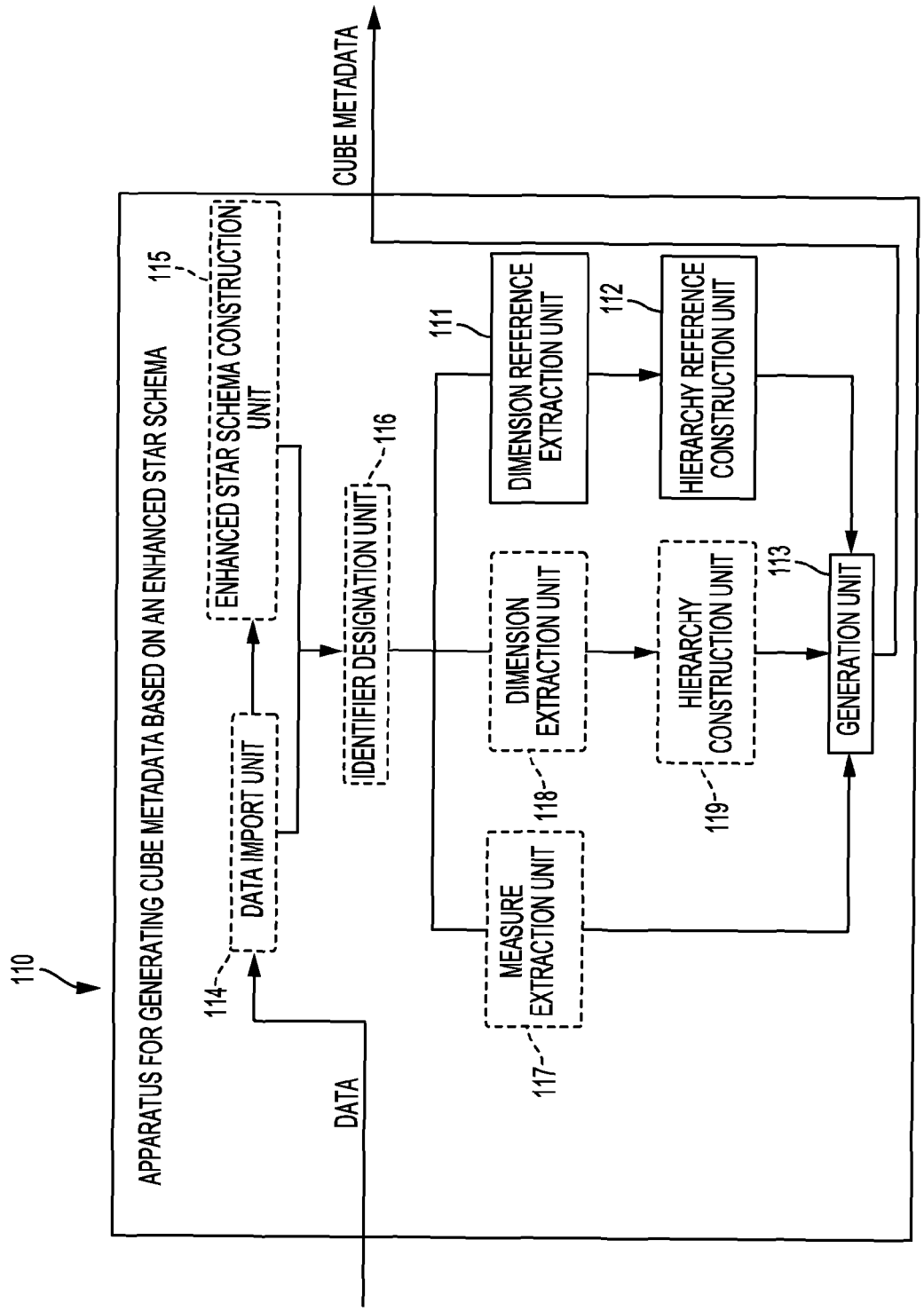
FIG. 11 shows a block diagram of an apparatus for generating cube metadata based on an enhanced star schema in the embodiment of the present invention.

Under the same inventive concept, the present invention provides an apparatus for generating cube metadata based on an enhanced star schema. FIG. 11 shows the block diagram of the apparatus.

With reference now to FIG. 11, the apparatus 110 for generating cube metadata based on an enhanced star schema comprises: a dimension reference extraction unit 111 configured to extract dimension references from a factless fact table in an enhanced star schema comprising a fact table, a plurality of dimension tables of the fact table and the factless fact table, with respect to the enhanced star schema, it may make a reference to the above description which is made referring to FIG. 2; a hierarchy reference construction unit 112 configured to construct a hierarchy reference based on the dimension references; and a generation unit 113 configured to generate cube metadata by combining the hierarchy reference with measures obtained from the fact table and a hierarchy obtained from the dimension tables in the enhanced star schema.

In addition, with reference to FIG. 11, the apparatus 110 further optionally comprises: a data import unit 114 configured to import data from a data source, the data comprising tables and their types as well as relational data in a relational database; an enhanced star schema construction unit 115 configured to construct an enhanced star schema based on the tables and types of tables, that is, associate the tables based on types of tables according to the enhanced star schema.

With reference to FIG. 11, the apparatus 110 further optionally comprises: an identifier designation unit 116 configured to respectively designate an identifier for the fact table, the plurality of dimension tables and the factless fact table in the enhanced star schema.

With reference to FIG. 11, the apparatus 110 further optionally comprises: a measure extraction unit 117 configured to extract measures from the fact table in the enhanced star schema. The apparatus 110 further optionally comprises: a dimension extraction unit 118 configured to extract dimensions from the plurality of dimension table in the enhanced star schema; and a hierarchy reference construction unit 119 configured to construct a hierarchy based on the extracted dimensions.

Figure 12:
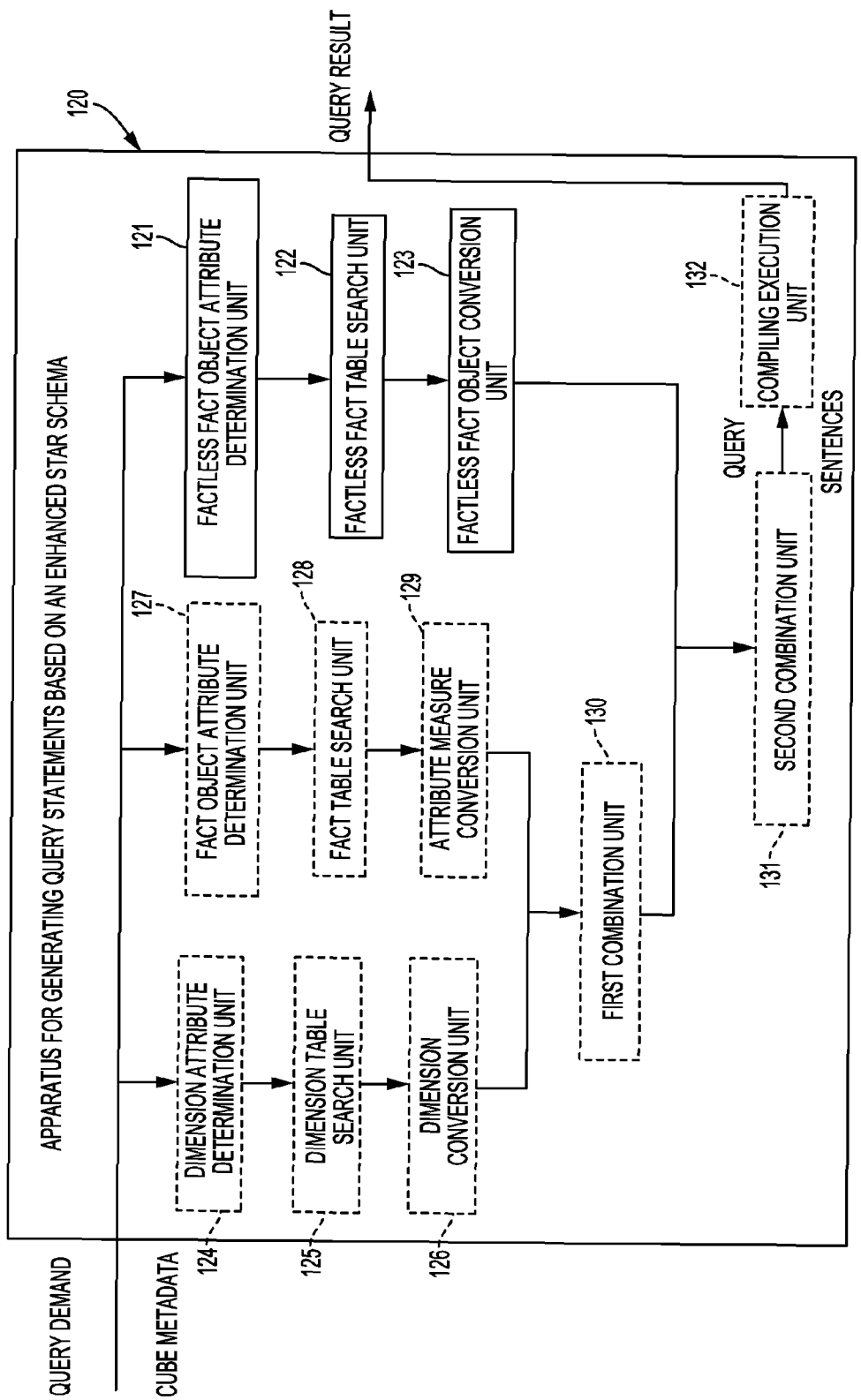
FIG. 12 shows a block diagram of an apparatus for generating query statements based on an enhanced star schema in the embodiment of the present invention.
Figure 13:
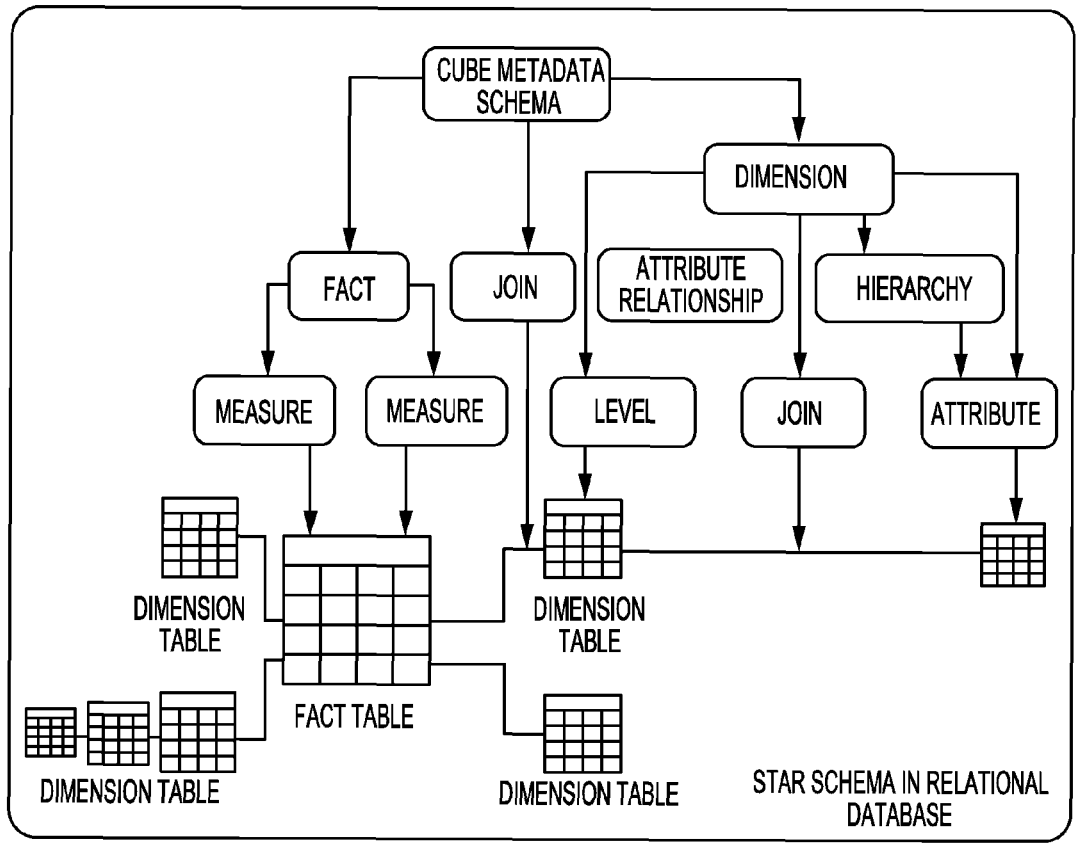
FIG. 13 is a schematic diagram of OLAP cube schema which is constructed based on the star schema in the prior art.
Figure 14:
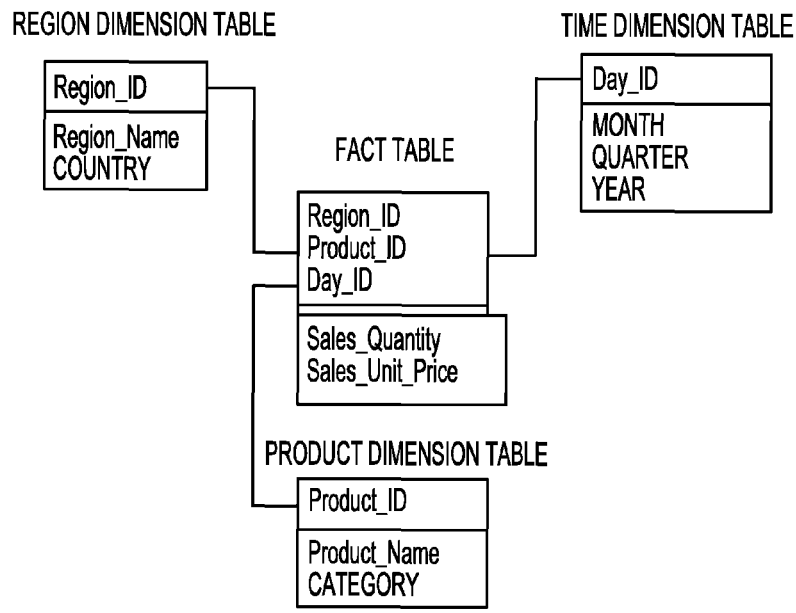
FIG. 14 shows a specific example of the star schema in the prior art.

In addition, the present invention also provides an apparatus for generating query statements based on an enhanced star schema. FIG. 12 shows the block diagram of the apparatus.

With reference to FIG. 12, the apparatus 120 for generating query statements based on an enhanced star schema of the present invention comprises: a factless fact object attribute determination unit 121 configured to determine attributes of a factless fact object used in a query based on cube metadata generated by using the above apparatus 110 and a query demand obtained from the external; a factless fact table search unit 122 configured to search for tables used by the factless fact object based on the cube metadata; and a factless fact object conversion unit 123 configured to convert the attributes of the factless fact object into a query expression based on the tables used by the factless fact object.

Herein, the factless fact object attribute determination unit 121 may, for a collection of dimensions, hierarchy and levels from the factless fact object in the query, determines the used attributes of the dimension, attributes of level keys of the levels and values thereof.

The factless fact table search unit 122 may check a table column/attribute reference list in the attributes of the factless fact object, determine reference tables of the attributes of the factless fact object based on the table column/attribute reference list, adds the reference tables to a table set used by corresponding attribute, and determines the junction relationship between the factless fact tables and the reference tables.

The factless fact object conversion unit 123 may allocate the identified factless fact tables a unique association name respectively, and forms a query expression in the following way for the factless fact object: taking the attributes of level keys of factless dimensions as a column; adding the factless fact tables and the association name thereof; values corresponding to the factless dimensions form user predicates, the predicates being combined in a form of OR.

In addition, with reference to FIG. 12, the apparatus 120 further optionally comprises: a dimension attribute determination unit 124 configured to determine attributes of dimensions used in the query based on the cube metadata and the query demand; a dimension table search unit 125 configured to search for the tables used by the determined dimensions based on the cube metadata; a dimension conversion unit 126 configured to convert the attributes of the dimensions to a query expression based on the tables used by the dimensions; a fact object attribute determination unit 127 configured to determine attributes of a fact object used in the query based on the cube metadata and the query demand; a fact table search unit 128 configured to search for the tables used by the fact object based on the cube metadata; an attribute measure conversion unit 129 configured to convert the attributes and measures of the fact object to a query expression based on the tables used by the fact object; and a first combination unit 130 configured to combine the query expression converted from the dimensions with the query expression converted from the fact object.

In addition, with reference to FIG. 12, the apparatus 120 further optionally comprises: a second combination unit 131 configured to take the query expression converted from the factless fact object as a table declaration, allocate it a unique association name, and generate final query statements by joining the table declaration in a junction object table of the combination of the query expression of the dimensions and the query expression of the fact object.

In addition, with reference to FIG. 12, the apparatus 120 further optionally comprises: a compiling execution unit 132 configured to compile the query statements and output the execution result.

The above is the specific description of the structure of the apparatus 110 for generating cube metadata based on an enhanced star schema and the apparatus 120 for generating query statements based on an enhanced star schema. Theses apparatus can implement the methods as described in combination with FIGS. 3, 4 and FIGS. 8, 9 respectively in terms of function.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating cube metadata based on an enhanced star schema, comprising:
   extracting, with a processor, dimension references from a factless fact table in an enhanced star schema comprising a fact table, a plurality of dimension tables of the fact table and the factless fact table, wherein the dimension table comprises a foreign key field and a set of measure fields; wherein the factless fact table shows a corresponding relationship between the dimension references and does not contain any measure field;
   constructing a hierarchy reference based on the dimension references; and
   generating cube metadata by combining the hierarchy reference with measures obtained from the fact table and a hierarchy obtained from the dimension tables in the enhanced star schema, wherein the factless fact table is directly used, without being converted, with the fact table and the plurality of dimension tables by expanding a star schema to directly comprise the factless fact table.

2. The method according to claim 1, wherein:
   the plurality of dimension tables respectively comprise a primary key and a set of characteristic fields of dimension corresponding to the dimension table;
   the fact table comprises at least one foreign key field pointing to the primary key of one of the plurality of dimension tables and a set of measure fields;
   the factless fact table contains a plurality of foreign key fields respectively pointing to the primary key of one of the plurality of dimension tables.

3. The method according to claim 1, further comprising:
   generating query statements based on an enhanced star schema, wherein generating query statements further comprise:
   determining attributes of a factless fact object used in a query based on the cube metadata and a query demand obtained from an external source;
   searching for tables used by the factless fact object based on the cube metadata; and
   converting the attributes of the factless fact object into a query expression based on the tables used by the factless fact object.

4. The method according to claim 3, wherein determining attributes of the factless fact object used in the query further comprises:

for a collection of dimensions, hierarchy, levels from the factless fact object in the query, determining the used attributes of the dimensions, attributes of level keys of the levels and values thereof.

5. The method according to claim 3, wherein searching for tables used by the factless fact object further comprises:
checking a table column/attribute reference list in the attributes of the factless fact object;
determining reference tables of the attributes of the factless fact object based on the table column/attribute reference list;
adding the reference tables to a table set used by corresponding attribute; and
determining the junction relationship between the factless fact tables and the reference tables.

6. The method according to claim 3, wherein converting the attributes of the factless fact object into a query expression further comprises:
allocating to the identified factless fact tables a unique association name respectively; and
forming a query expression in the following way for the factless fact object:
providing a Select clause comprising:
taking the attributes of level keys of factless dimensions as a column;
providing a From clause comprising:
adding the factless fact tables and the association name thereof;
providing a Where clause comprising:
values corresponding to the factless dimensions form user predicates, the predicates being combined in a form of an OR operation.

7. The method according to claim 6, further comprising:
determining attributes of dimensions used in the query based on the cube metadata and the query demand;
searching for the tables used by the determined dimensions based on the cube metadata;
converting the attributes of the dimensions to a query expression based on the tables used by the dimensions;
determining attributes of a fact object used in the query based on the cube metadata schema and the query demand;
searching for the tables used by the fact object based on the cube metadata;
converting the attributes and measures of the fact object to a query expression based on the tables used by the fact object; and
combining the query expression converted from the dimensions with the query expression converted from the fact object.

8. The method according to claim 7, further comprising:
using the query expression converted from the factless fact object as a table declaration and allocating to the table declaration a unique association name; and
generating final query statements by joining the table declaration in a junction object table of the combination of the query expression of the dimensions and the query expression of the fact object.

9. The method according to claim 8, further comprising:
compiling the query statements and outputting the query execution result.

10. An apparatus for generating cube metadata based on an enhanced star schema, comprising:
a memory; and
a processor communicatively coupled to the memory, wherein the processor is configured to perform a method comprising:
extracting dimension references from a factless fact table in an enhanced star schema comprising a fact table, a plurality of dimension tables of the fact table and the factless fact table, wherein the factless fact table comprises a foreign key field and a set of measure fields; wherein the dimension table shows a corresponding relationship between the dimension references and does not contain any measure field;
constructing a hierarchy reference based on the dimension references; and
generating cube metadata by combining the hierarchy reference with measures obtained from the fact table and a hierarchy obtained from the dimension tables in the enhanced star schema, wherein the factless fact table is directly used, without being converted, with the fact table and the plurality of dimension tables by expanding a star schema to directly comprise the factless fact table.

11. The apparatus according to claim 10, wherein:
the plurality of dimension tables respectively comprise a primary key and a set of characteristic fields of dimension corresponding to the dimension table;
the fact table comprises at least one foreign key field pointing to of the primary key of one of the plurality of dimension tables and a set of measure fields;
the factless fact table comprises a plurality of foreign key fields respectively pointing to the primary key of one of the plurality of dimension tables.

12. The apparatus according to claim 10, wherein the method performed by the processor further comprises:
generating query statements based on an enhanced star schema; and
determining attributes of a factless fact object used in a query based on the cube metadata and a query demand obtained from the external;
searching for tables used by the factless fact object based on the cube metadata; and
converting the attributes of the factless fact object into a query expression based on the tables used by the factless fact object.

13. The apparatus according to claim 12, wherein the factless fact object attribute determination module, for a collection of dimensions, hierarchy and levels from the factless fact object in the query, determines the used attributes of the dimension, attributes of level keys of the levels and values thereof.

14. The apparatus according to claim 12, wherein the factless fact table search module checks a table column/attribute reference list in the attributes of the factless fact object, determines reference tables of the attributes of the factless fact object based on the table column/attribute reference list, adds the reference tables to a table set used by corresponding attribute, and determines the junction relationship between the factless fact tables and the reference tables.

15. The apparatus according to claim 12, wherein the factless fact object conversion module allocates to the identified factless fact tables a unique association name respectively, and forms a query expression in the following way for the factless fact object:
providing a Select clause comprising:
taking the attributes of level keys of factless dimensions as a column;
providing a From clause comprising:
adding the factless fact tables and the association name thereof;

providing a Where clause comprising:
 values corresponding to the factless dimensions form user predicates, the predicates being combined in a form of an OR operation.

16. The apparatus according to claim 15, wherein the processor is further configured to:
 determine attributes of dimensions used in the query based on the cube metadata and the query demand;
 for the tables used by the determined dimensions based on the cube metadata;
 convert the attributes of the dimensions to a query expression based on the tables used by the dimensions;
 determine attributes of a fact object used in the query based on the cube metadata and the query demand;
 search for the tables used by the fact object based on the cube metadata;
 convert the attributes and measures of the fact object to a query expression based on the tables used by the fact object; and
 combine the query expression converted from the dimensions with the query expression converted from the fact object.

17. The apparatus according to claim 16, wherein the processor is further configured to:
 use the query expression converted from the factless fact object as a table declaration, allocate to the table declaration a unique association name, and generate final query statements by joining the table declaration in a junction object table of the combination of the query expression of the dimensions and the query expression of the fact object.

18. The apparatus according to claim 17, wherein the processor is further configured to:
 compile the query statements and output the execution result.

* * * * *